United States Patent
Salz et al.

(10) Patent No.: US 6,811,205 B2
(45) Date of Patent: Nov. 2, 2004

(54) REMOVABLE VEHICLE ROOF

(75) Inventors: Wolfram Salz, Vaihingen (DE); Gernot Bruder, Karlsruhe (DE); Markus Papendorf, Besigheim (DE); Andreas Hasselgruber, Eberdingen-Nussdorf (DE); Matthias Rösler, Stuttgart (DE); Frank Bertz, Rutesheim (DE)

(73) Assignee: CTS Fahrzeug-Dachsysteme GmbH, Hamburg (DE)

( * ) Notice: Subject to any disclaimer, the term of this patent is extended or adjusted under 35 U.S.C. 154(b) by 0 days.

(21) Appl. No.: 10/704,493

(22) Filed: Nov. 8, 2003

(65) Prior Publication Data

US 2004/0094987 A1 May 20, 2004

Related U.S. Application Data

(63) Continuation-in-part of application No. PCT/EP02/12370, filed on Nov. 6, 2002.

(30) Foreign Application Priority Data

| Dec. 3, 2001 | (DE) | 101 58 938 |
| Feb. 15, 2002 | (DE) | 102 06 650 |

(51) Int. Cl.$^7$ ................................................ B60J 7/14
(52) U.S. Cl. .................................. 296/108; 296/107.17
(58) Field of Search ................................ 296/108, 113, 296/115, 117, 133, 134, 107.17

(56) References Cited

U.S. PATENT DOCUMENTS 4,936,626 A * 6/1990 Gmeiner et al. ............. 296/108
6,502,891 B2 * 1/2003 Russke ................... 296/107.17

FOREIGN PATENT DOCUMENTS

| DE | 869 159 | 4/1953 |
| DE | 40 26 392 | 2/1992 |
| DE | 198 05 477 | 8/1999 |
| DE | 199 60 010 | 5/2001 |
| DE | 100 21 333 | 8/2001 |

* cited by examiner

Primary Examiner—Jason Morrow
(74) Attorney, Agent, or Firm—Klaus J. Bach

(57) ABSTRACT

In a removable vehicle roof supported by way of an operating mechanism on a vehicle body for movement between a closed position, in which the vehicle roof covers an interior vehicle space and a storage position in which the roof is deposited in a vehicle storage compartment, a spring element is supported on the vehicle body and connected to the roof operating mechanism in such a way as to bias the operating mechanism in each of the two end positions of the roof in a direction toward the other end position so as to facilitate movement of the vehicle roof out of each end position.

7 Claims, 4 Drawing Sheets

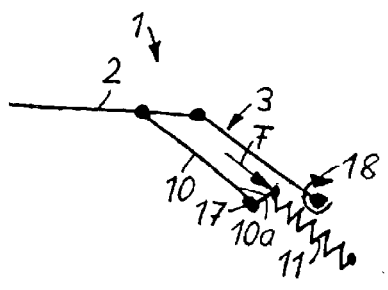
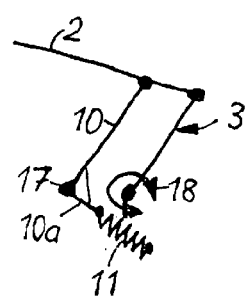
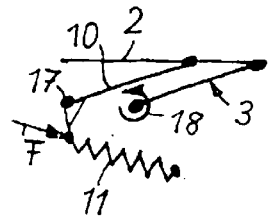
Fig. 4a     Fig. 4b     Fig. 4c
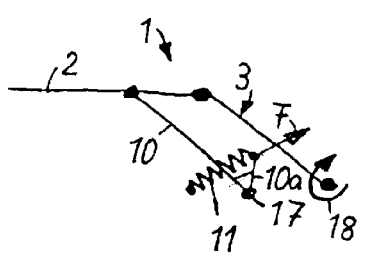
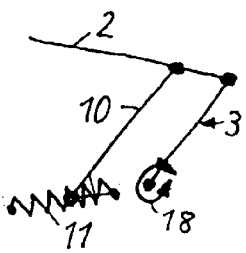
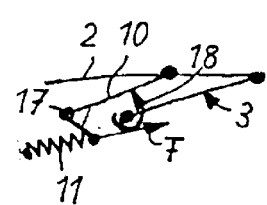
Fig. 5a     Fig. 5b     Fig. 5c

REMOVABLE VEHICLE ROOF

This is a Continuation-In-Part application of international application PCT/EP02/12370 filed Nov. 6, 2002 and claiming the priority of German applications 101 58 938.7 filed Dec. 3, 2001 and 102 06 650.7 filed Feb. 15, 2002.

BACKGROUND OF THE INVENTION

The invention relates to a removable vehicle roof with an operating mechanism by way of which the roof can be moved between a closed position, in which the roof covers the vehicle interior, and a storage position, in which the roof is deposited in a storage compartment.

DE 199 60 010 C1 discloses a vehicle roof which is movable between a closed position, in which it covers the vehicle interior, and a storage position, in which the roof is deposited in a rear storage compartment. The roof is operable by an operating mechanism, which is supported on a vehicle body console and which is operable by a first hydraulic operating element. The console is pivotally supported on the vehicle body and can be pivoted by a second hydraulic operating element. This combined movement by way of the roof operating mechanism on one hand and the console supporting the roof operating mechanism on the other hand provides for a compact storage structure, but it requires the activation of two separate, energy-consuming operating elements.

DE 198 05 477 C1 discloses a convertible vehicle with a hardtop vehicle roof comprising two rigid roof parts which are supported on the vehicle body by way of a roof operating mechanism and which can be moved between the closed and the storage positions by an operating element connected to an arm of the roof operating mechanism. The roof operating mechanism is in the form of a four-link mechanism by way of which the rear roof part is supported on the vehicle body.

Such operating mechanisms have the disadvantage that, because of the relatively short length of the lever section disposed between the pivotal vehicle body support point of the roof operating mechanism and the connecting point of the control element, relatively large operating forces are needed for the transfer of the vehicle roof between its end positions. These large operating forces can easily be generated by the hydraulic operating element but the components which are engaged by the hydraulic element, that is, the roof operating mechanism and the support area on the vehicle body may be deformed by such large forces.

It is also a disadvantage that generally an advantageous lever ratio of the operating element with respect to the roof operating mechanism is present only in one of the two end positions of the vehicle roof whereas the roof has to be moved out of the other end portion with a disadvantageous lever arrangement, which requires high operating forces. As a result, the chances of applying to the vehicle components exceedingly high operating forces which may damage the components are quite high.

DE 40 26 392 A1 discloses a pop-up roof for a motor home which can be pivoted up from the vehicle body roof structure so that it is upwardly angled. The pop-up roof is raised by a roof operating mechanism, which comprises two arms, which are linked together and can be moved between a folded position and an upstanding position. In order to compensate about for the weight of the movable roof part one of the two arms of the roof operating mechanism is provided with a tension spring which is connected to a rope that extends around the joint of the two arms and which is connected with its end remote from the tension spring to the other arm. The tension spring exerts on the operating mechanism permanently a force in opening direction, that is a force which biases a roof in opening direction that is a force which biases the two arms from their folded position, in which the roof is closed, to an open position in which the roof is popped up. The spring force is active at all times in the pop-up direction of the roof, that is opposite to the weight of the roof, so that in principle only dynamic operating forces and friction forces in the bearings have to be overcome for the opening and closing of the pop-up roof. The pop-up roof is therefore biased by the spring always toward its open position.

Convertible vehicles with roofs, which can be moved into a vehicle storage compartment have the problem that the vehicle roof should be stable in its closed position and also in its storage position in which the roof is held by its weight. For the transfer between the closed and the storage positions generally an instable position of the vehicle roof has to be overcome wherein the roof and the roof operating mechanism are partially raised but are in an unstable equilibrium position. As a result, when being raised out of the closed or the storage positions, first the weight forces of the vehicle roof have to be overcome until the unstable equilibrium position is reached. Subsequently, the weight of the roof acts to move the roof into the opposite end position. Also, during this movement, a force has to be applied by an operating member, this time however in a braking direction to ensure smooth movement into the end position.

It is the object of the present invention to provide a movable vehicle roof which can be moved out of at least one of its end positions and, expediently, out of both end positions while requiring only relatively small operating forces and to achieve this with simple means.

SUMMARY OF THE INVENTION

In a removable vehicle roof supported by way of an operating mechanism on a vehicle body for movement between a closed position, in which the vehicle roof covers an interior space of the vehicle, and a storage position, in which the roof is deposited in a vehicle storage compartment, a spring element is supported on the vehicle body and connected to the roof operating mechanism in such a way as to bias the operating mechanism in each of the two end positions of the roof in a direction toward the other end position so as to facilitate movement of the vehicle roof out of each end position.

The spring element facilitates the initial movement of the vehicle roof upon raising from the respective end position so that the operating forces to be applied by the actuating element which engages the roof operating mechanism can be smaller than those used in the state of the art and the chances of deforming any components are greatly reduced.

Furthermore, the spring element counteracts the movement of the roof when approaching an end position so that the movement of the roof is slowed down in the final stage before reaching the end position and, in an ideal situation, the speed of the roof is zero when reaching the end position. The end position is therefore reached in a shock- and impulse-free way which avoids damage to the roof operating mechanism and locking components and is comfortable for the occupants of the vehicle.

The reduction of the operating forces needed for operating the roof also permits the use of a smaller operating element, which also consumes less power.

Furthermore, the manual operation of the roof is greatly facilitated if the actuating element should foil.

Expediently, the spring acts on the roof operating mechanism in each of its end positions, that is in the closed position and in storage position so as to bias the operating mechanism toward the opposite end position. To this end, two spring elements may be provided which act in opposite directions. However, in a particularly advantageous embodiment of the invention a single spring element is provided which may be a tension-compression spring, which, in one end position, is subjected to tension forces and, in the opposite end position, is subjected to compression forces. In an alternative embodiment, the spring element is subjected in each end position in the same way. This can be achieved in that the spring element is connected to a component of the operating mechanism, which, for lifting the roof from either of its end positions, is displaced in the same direction. In this case, preferably a gas compression spring is used as the spring element.

The roof operating mechanism is preferably a four-link mechanism including two links supported on the vehicle baby and an intermediate coupling link. Preferably, one of the vehicle body-supported links is used as a drive link, which is operated by the actuating element. Expediently, the second vehicle body supported link is a support link, which is engaged by the spring element. The support link is preferably a triangle link, which, at an intermediate corner, is supported on the vehicle body and is pivotally connected at the other corners to the coupling link and the spring element, respectively. The support link's path of movement during the transfer of the roof from the closed to the storage position is essentially the same as it is during movement of the roof in the opposite direction, that is, it is a pivot movement first in one direction which is reversed to the opposite direction when the vehicle roof passes an intermediate position. This embodiment is particularly suitable for the use of a spring element, which is effective only in one direction such as a gas compression spring.

The spring element or, respectively, spring elements are expediently arranged and tuned in such a way that the resulting spring force of the spring element or, respectively, spring elements effective on the roof operating mechanism becomes essentially zero at an intermediate position of the vehicle roof between the closed and the storage positions. The operating forces required for the operation of the vehicle roof by the actuating element are minimized thereby.

Advantageous embodiments of the invention will be described below in greater detail on the basis of the accompanying drawings.

BRIEF DESCRIPTION OF THE DRAWING

FIGS. 4a, 4b and 4c show the roof schematically in various positions with a tension spring element, and FIGS. 5a, 5b, and 5c show the roof schematically in various positions with a compression spring element.

DESCRIPTION OF A PREFERRED EMBODIMENT

Figure 1:
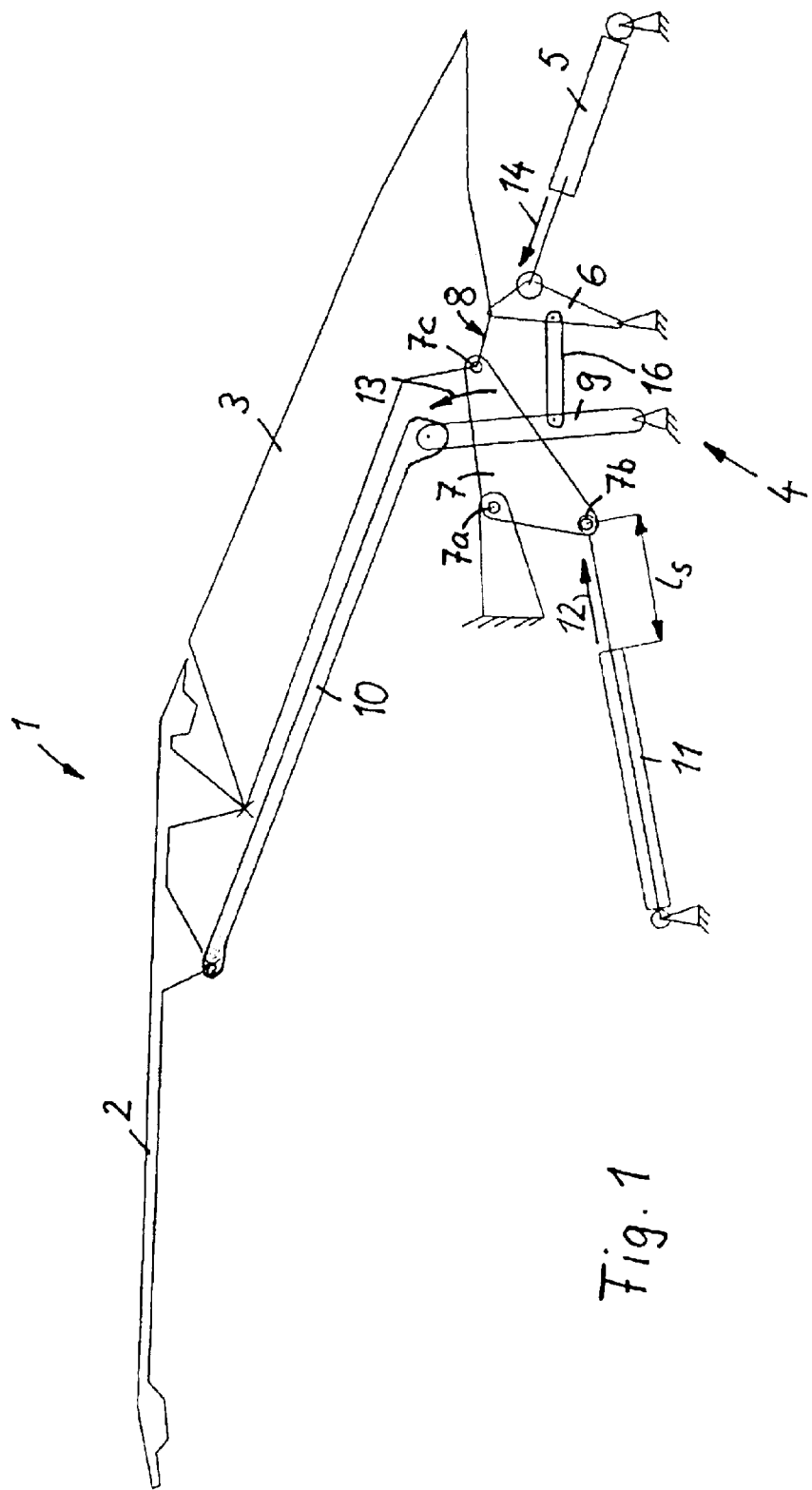
FIG. 1 shows a removable vehicle roof with a roof operating mechanism, which is supported on the vehicle body and which is acted on by a hydraulic operating element and also by a gas compression spring, the roof being shown in the closed position.

In the figures identical components are indicated by the same reference numerals.

Figure 3:
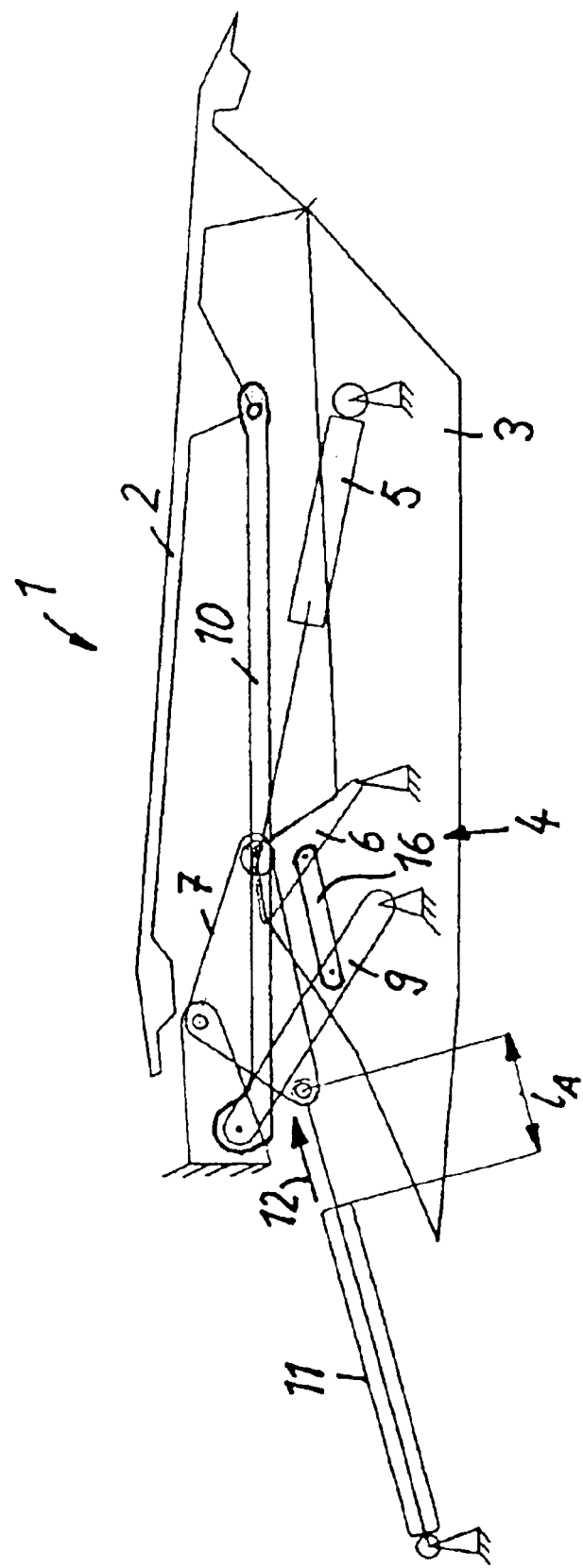
FIG. 3 shows the vehicle roof in the storage position behind the passenger compartment.

FIG. 1 shows a vehicle roof 1 in the form of a removable hardtop roof with a front roof part 2 and a rear roof part 3, which are each formed by rigid shells and supported on the vehicle body by way of a roof operating mechanism 4. The roof operating mechanism 4 can be actuated by a hydraulic cylinder 5, which is also connected to the vehicle body. The roof 1 is movable between the closed position as shown in FIG. 1 and the storage position as shown in FIG. 3. The roof operating mechanism 4 comprises a four-link mechanism comprising a drive link 6 supported on the vehicle body, a support link 7 also supported on the vehicle body and a C-column link 8, by which the links 7 and 8 are pivotally interconnected. With this four-link joint, the rear roof part 3 is pivotally supported on the vehicle body. The C-column link 8 may be formed by a section of the rear roof part 3. The hydraulic cylinder 5, which is also pivotally supported at one end on the vehicle body, is connected with its other end to the drive link 6. When the piston rod of the hydraulic cylinder 5 is linearly extended, the drive link 6 is pivoted about its vehicle body-based pivotal support axis and, as a result, activates the whole roof operating mechanism resulting in the movement of the roof to its storage position as shown in FIG. 3.

The roof operating mechanism 4 further comprises an auxiliary arm 9, which is pivotally supported on the vehicle body and to which one end of a main link 10 is pivotally connected whose other end remote from the auxiliary arm 9 is pivotally connected to the front roof part 2. In addition, a coupling link 16 is provided by which the auxiliary arm is coupled to the drive link 6 and which is pivotally connected to the drive link 6 and to the auxiliary arm 9. In this way, a kinematically well-defined movement of the front roof part 2 is achieved.

The support link 7, which is part of the four-link mechanism by which the rear roof part 3 is supported on the vehicle body is engaged by a spring element 11, which biases the support link in a direction as indicated by arrow 12. In the example shown, the spring element is a gas compression spring, which is pivotally supported on the vehicle body and is connected to the support link 7 by way of a joint 7b. The support link 7 is in the form of a triangle arm, which is pivotally supported on the vehicle body by a joint 7a and which is pivotally connected to the C-pillar link 8 by a joint 7c which is disposed opposite the joint 7b. The spring element 11 is of such a shape and is so arranged that, in the closed position of the vehicle roof as shown in FIG. 1, the spring element 11 provides a spring force in the direction 12 to the joint 7b of the support link 7 so that a counterclockwise moment as indicated by arrow 13 about the joint 7a is effective on the support link 7. The moment in the direction of the arrow 13 supports the movement of the roof operating mechanism 4, when the hydraulic cylinder 5 is extended in the direction of the arrow 14 at the beginning of the roof movement, by which the vehicle roof is raised from the closed position shown in FIG. 1 and moved to the storage position. The supportive torque generated by the spring element 11 facilitates the lifting of the roof from its closed position. The direction of the arrow 13, which represents the moment effective on the support link 7 is identical with that of the initial pivot movement of the support link as generated by the actuation of the hydraulic cylinder 5 for raising the roof out of its closed position.

Figure 2:
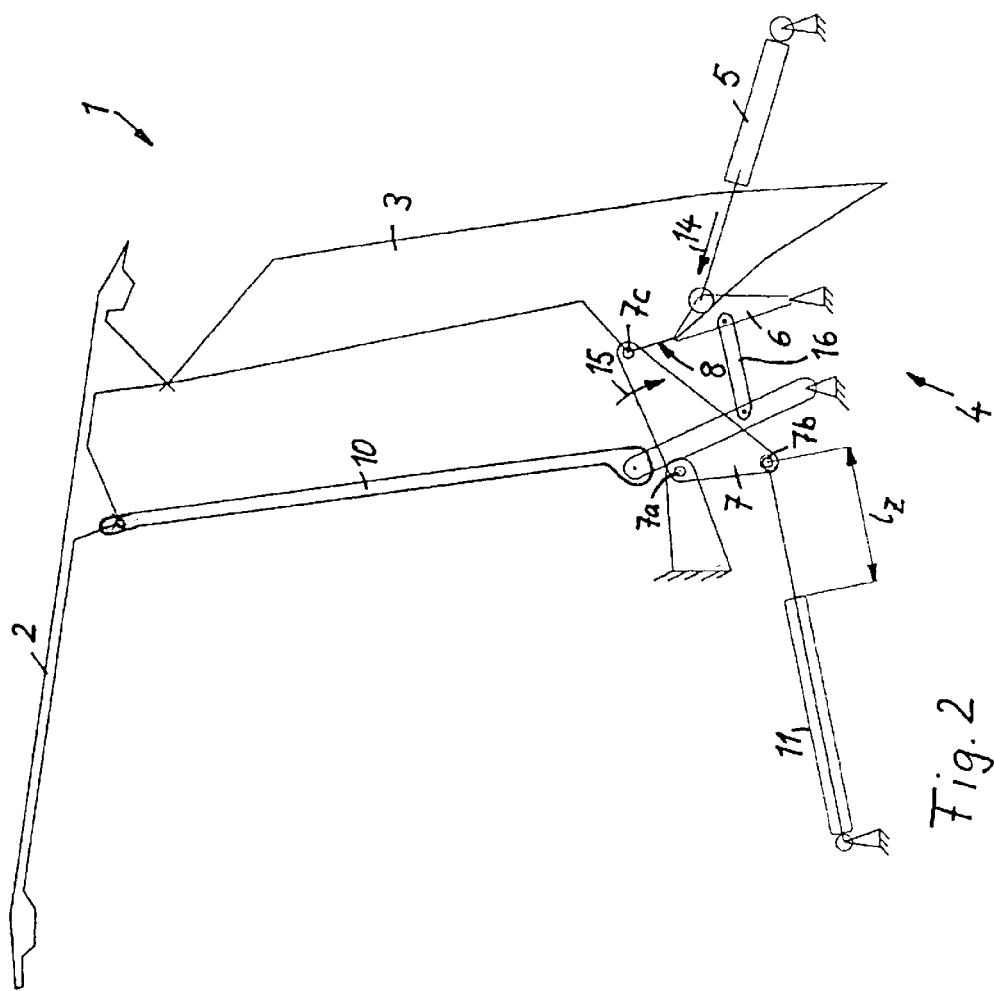
FIG. 2 shows the vehicle roof in an intermediate position between the closed and the storage positions.

FIG. 2 shows the vehicle roof in an intermediate position between the closed position and the storage position. In this intermediate position, the hydraulic cylinder 5 is not fully extended and continues to move in the direction of the arrow 14 until the final storage position is reached. The support link 7, in contrast, has reached a reversal position. When this reversal position has been reached, the pivot direction of the support link 7 is reversed to a direction opposite that indicated by the arrow 13 in FIG. 1. The support link 7 then pivots in clockwise direction as indicated by the arrow 15 in FIG. 2 so that, as the roof approaches its end position, the support link 7 is again returned to its original position. In the intermediate position as shown in FIG. 2, the spring element 11 is in its farthest expanded state, which is indicated by the distance $l_z$ (FIG. 2), which is greater than the distance $l_s$ as shown in FIG. 1, where the roof is shown in the closed position. In the reversal point of the support link 7, the spring element expediently exerts no, or only a very small, spring force on the support link 7.

FIG. 3 shows the vehicle roof in the storage position in a ear storage compartment. The rear roof part is pivoted by about 180° with respect to its closed position, specifically by about 160° and is arranged with its topside facing downwardly. The front part keeps its original orientation so that its top-side faces upwardly. It is disposed directly on top of the rear roof part. The hydraulic cylinder 5 is maximally extended. The support link 7 is again pivoted back from its position assumed in the intermediate position of the roof so that the expansion length $l_A$ of the spring element 11 is less than the expansion length $l_z$ which corresponds to the intermediate position shown in FIG. 2, and also less than the expansion length $l_s$ in the closed position of the roof as shown in FIG. 1. The spring element provides in the storage position a spring force in the direction of the arrow 12 on the support link 7 which generates a moment in counter-clockwise direction which biases the vehicle roof toward a closed position. In this way, the lifting forces required to move the vehicle roof out of the storage position for closing are also reduced by the spring element 11.

FIGS. 4a, 4b, and 4c show arrangements for the spring elements in the form of a tension spring wherein, in the closed position of the vehicle roof 1 (FIG. 4a), the spring 11 generates a force F on the arm extension 10a around the pivot joint 17 in the opening direction of the roof 1 as indicated by the arrow 18, FIG. 4b shows the arrangement in a balanced center position, in which no torque force is effective and FIG. 4c shows the roof in the open position in which the tension spring 11 applies a force F in the closing direction of the roof indicated by arrow 18.

FIGS. 5a, 5b and 5c shows the arrangement in connection with a compression spring element 11, wherein FIG. 5 shows the roof in a closed position in which the compression spring 11 generates a force F on the arm extension 10a around the pivot joint 17 in the roof opening direction, FIG. 5b shows the roof in an intermediate balanced position in which no torque force is generated by the spring 11 and FIG. 5c shows the roof in an open position in which a force F in the roof closing direction 18 is generated by the spring 11.

Upon closing of the roof, the whole procedure occurs in the opposite direction.

What is claimed is:

1. A removable vehicle roof supported on a vehicle body and including a four-link roof operating mechanism (4) mounted on said vehicle body for supporting and guiding said vehicle roof (1) during movement between a closed end position, in which the vehicle roof (1) covers an interior vehicle space, and a storage position, in which the vehicle roof is disposed in a vehicle storage compartment, an actuating element (5) for operating said roof operating mechanism and a spring element (11) supported on said vehicle body and said operating mechanism (41) so as to bias said operating mechanism in each end position of said vehicle roof toward the other end position thereof, said four-link roof operating mechanism (4) including first and second links (6, 7) supported on the vehicle body and a C-pillar link (8) extending between said first and second vehicle body supported links (6, 7), said actuating element (5) being also supported on said vehicle body and connected to one of said two vehicle body supported links (6, 7) which forms a drive link for operating said vehicle roof (1).

2. A removable vehicle roof according to claim (1), wherein the second (7) of said two vehicle body supported links (6, 7) is a support link and said spring element (11) is connected to said support link (7).

3. A removable vehicle roof according to claim 2, wherein said support link is in the form of a triangle link having two end joints and an intermediate joint by which said triangle link is pivotally supported on said vehicle body, one of said end joints connecting said triangle link to said c-pillar link and the other being connected to said spring element.

4. A removable vehicle roof according to claim 1, wherein said spring element is compressed by said operating mechanism in both end positions of said vehicle roof.

5. A removable vehicle roof according to claim 1, wherein said spring element is so selected that, in an intermediate position of said vehicle roof between the two end positions thereof, the spring force effective on said vehicle operating mechanism is essentially zero.

6. A removable vehicle roof according to claim 1, wherein said spring element is a gas compression spring.

7. A removable vehicle roof according to claim 1, wherein said vehicle roof is a hardtop vehicle roof comprising at least two rigid roof shells.

\* \* \* \* \*